(12) United States Patent
Al harshani

(10) Patent No.: US 6,357,383 B1
(45) Date of Patent: Mar. 19, 2002

(54) FROZEN FOOD THAW INDICATOR AND METHOD FOR MAKING THE SAME

(76) Inventor: Mubarak Dakeel Al harshani, House No. 508, Block No. 3, Al-Waha-00007, Al-Jahara (KW)

( * ) Notice: Subject to any disclaimer, the term of this patent is extended or adjusted under 35 U.S.C. 154(b) by 0 days.

(21) Appl. No.: 09/676,980

(22) Filed: Oct. 2, 2000

(51) Int. Cl.⁷ ............................................. G01K 11/06
(52) U.S. Cl. ........................ 116/216; 116/219; 426/88
(58) Field of Search .................. 116/206, 207, 116/216, 217, 219; 374/141, 160; 426/88

(56) References Cited

U.S. PATENT DOCUMENTS

| 1,535,536 A | * | 4/1925 | Macdonald | 116/219 |
|---|---|---|---|---|
| 2,823,131 A | * | 2/1958 | Power | 116/219 |
| 2,852,394 A | | 9/1958 | Fahringer | |
| 3,243,303 A | * | 3/1966 | Johnson | 116/207 |
| 3,844,718 A | | 10/1974 | Cohen | |
| 3,967,579 A | * | 7/1976 | Seiter | 116/219 |
| 4,120,818 A | * | 10/1978 | Swindells et al. | 116/219 |
| 4,148,272 A | * | 4/1979 | Wetzold | 116/219 |
| 4,163,427 A | * | 8/1979 | Cooperman et al. | 116/217 |

* cited by examiner

Primary Examiner—Andrew H. Hirshfeld
(74) Attorney, Agent, or Firm—Dougherty & Troxell

(57) ABSTRACT

A defrosting indicator for frozen foods is made from a piece of transparent tape and a layer or multiple layers of absorbent material. The indicator also includes a segment of a frozen ink cartridge of the kind used in ball point pens. The absorbent material is placed on top of the adhesive side of the tape with the frozen segment placed on top of the absorbent material. The tape and absorbent material are then folded over with the frozen ink segments in between the absorbent material. The edges of the tape are sealed together and the indicator placed on a container of frozen food.

8 Claims, 6 Drawing Sheets

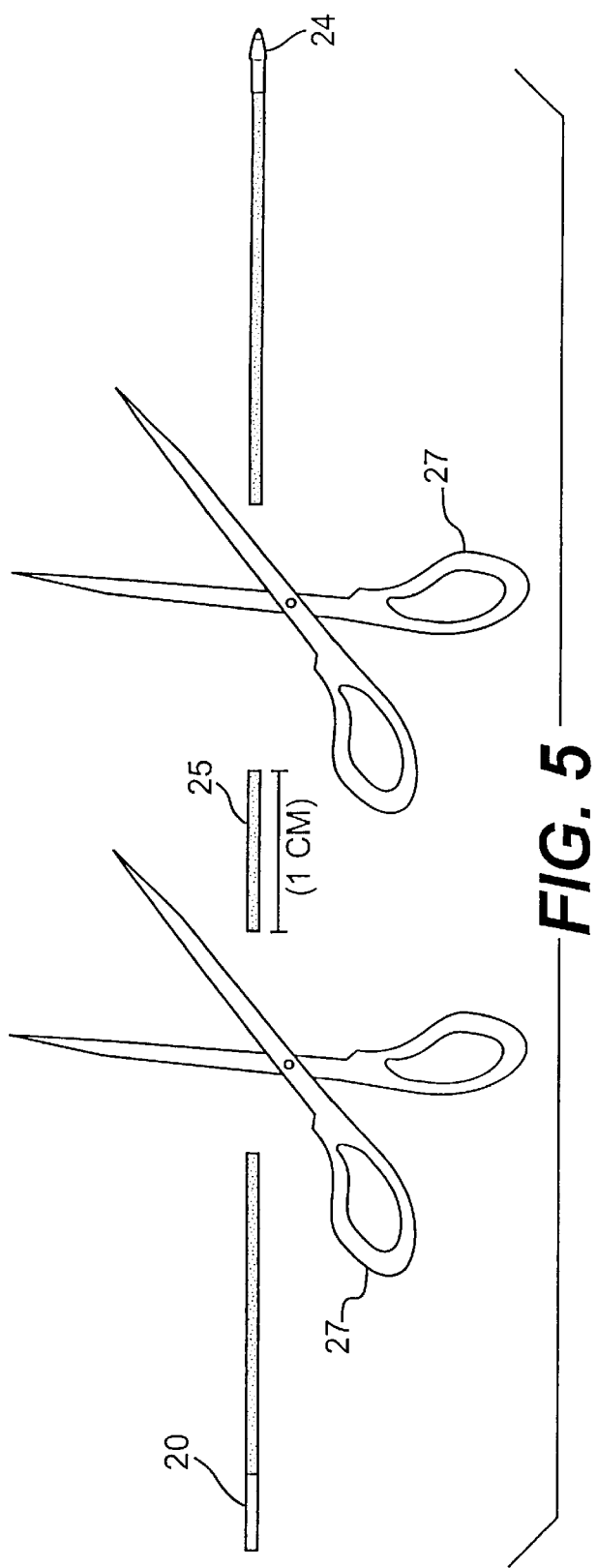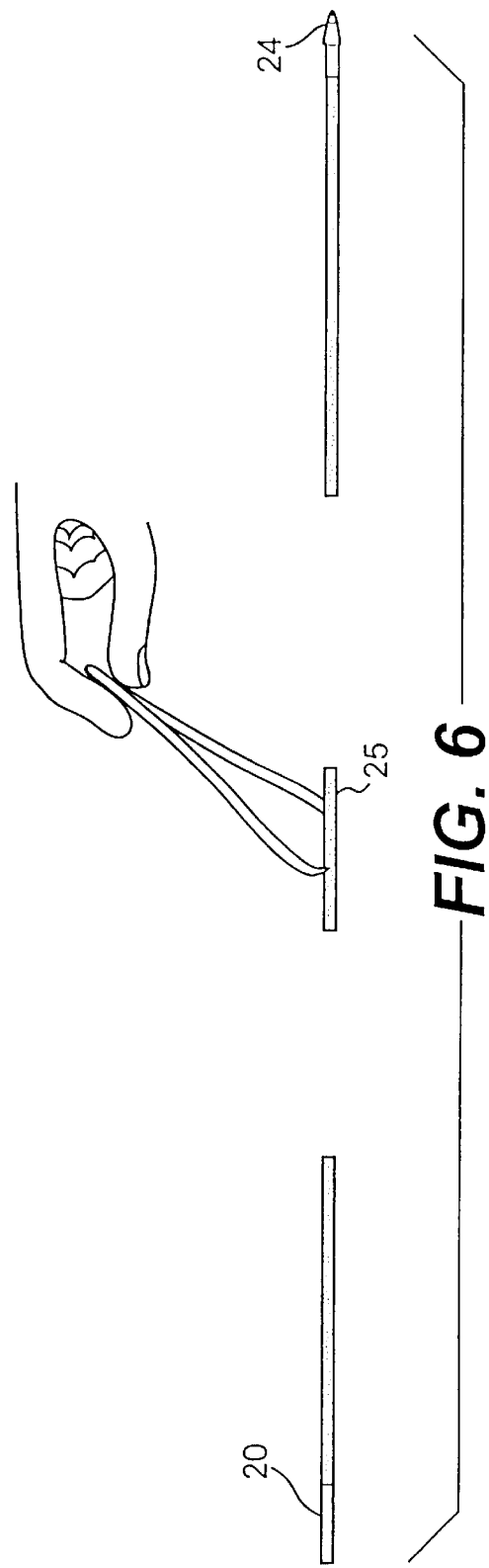

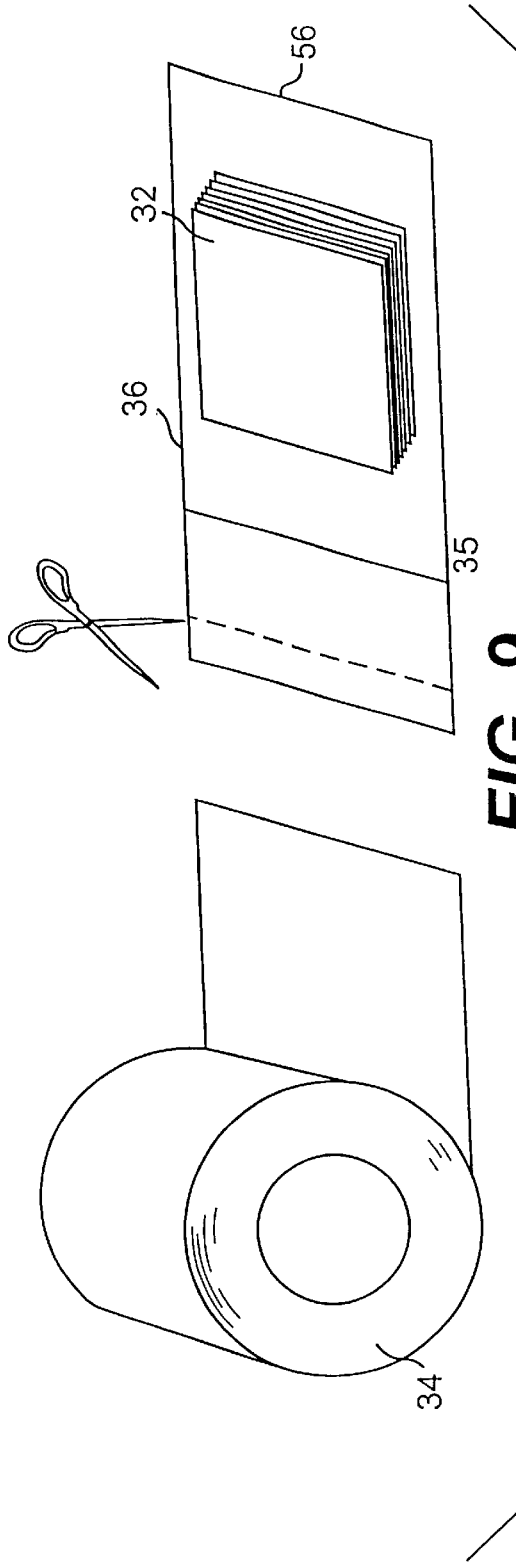
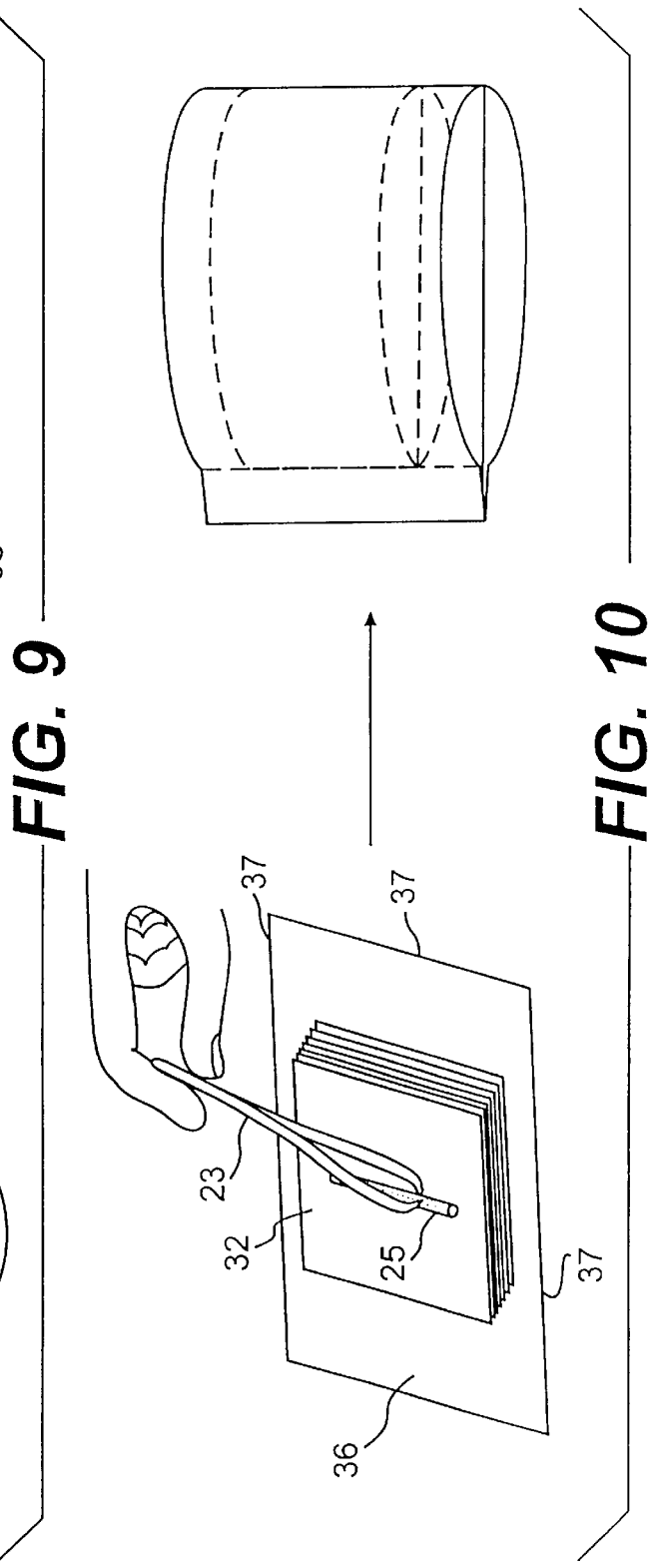
FIG. 9
FIG. 10

180; # FROZEN FOOD THAW INDICATOR AND METHOD FOR MAKING THE SAME

FIELD OF THE INVENTION

This invention relates to thaw indicators for frozen foods, to a method for making such indicators and more particularly to thaw indicators which provide an irreversible visual signal to indicate that a product has been exposed to above freezing temperatures.

BACKGROUND FOR THE INVENTION

Foods are frequently frozen in order that they may be preserved for consumption at a later time. If these frozen foods are thawed even for a short period of time, they may be subject to spoiling and at the very least their characteristics may change so that they are undesirable for later use. Accordingly there have been a number of approaches to manufacture and use thaw indicators for frozen foods.

One such approach is disclosed in a U.S. patent of Fahringer No. U.S. Pat. No. 2,852,394. The Fahringer patent discloses a frozen food thaw indicator which is made by dissolving red and blue vegetable dyes in water. Cotton cords are impregnated with the dyes, frozen intertwined and attached to an article of food and placed in a freezer. If the article thaws, the liquid in the cords allows intermixing of the dyes to promote evidence of thawing.

A more recent patent of Cohen U.S. Pat. No. 3,844,718 discloses a frozen food defrosting indicator which incorporates a waterproof transparent capsule containing an indicator which includes indicia printed in water soluble ink on a hydroscopic substance. The indicator is secure to a frozen food shipment to be monitored and the indicator placed in communication with the shipment. If the shipment defrosts, the indicator admits water or water vapor from the shipment irreversibly effecting the appearance of the water-soluble indicia.

Notwithstanding the above, it is presently believed that there may be a relatively large commercial demand for an improved frozen food thaw indicator and a method for making such indicators. Such indicators are believed to be particularly appealing for individuals who freeze their own products for home use since they are relatively easy to make, inexpensive and can be easily prepared while an individual is preparing homegrown vegetables or the like for freezing. The thaw indicator in accordance with the present invention can also be applied to store bought frozen foods to make certain that they do not become thawed and refrozen during power outages or other malfunctions of a freezer or for example if a door to a freezer is inadvertently left open by a child. The thaw indicators in accordance with the present invention are believed to be relatively durable, easily attached to frozen foods and reliable in giving an irreversible indication when a product is partially thawed.

BRIEF SUMMARY OF THE INVENTION

In essence the present invention contemplates a defrosting indicator for frozen foods which can be readily fabricated in an individuals home using readily available materials. The defrosting indicator includes a piece of transparent tape and at least one and preferably more layers of absorbent material. For example, in a preferred embodiment of the invention, multiple layers of relatively absorbent paper such as paper towels, Kleenex tissues or even toilet tissues may be used. The indicator also includes a frozen segment of an ink cartridge disposed between layers of the absorbent material. The ink cartridge which includes a tubular casing containing semi-dried ink as for example of the type used in ball point pens. The absorbent media or material and frozen segment of semi-dried ink are encased in the transparent tape which is then adapted for attachment to a container of frozen foods, as for example by another piece of transparent tape. Then, if the container is partially thawed, the ink will flow out of the tube and form an ink blot on the absorbent media as an irreversible indication that the food may not be safe to eat.

The invention also contemplates a method for making a defrosting indicator. The method which utilizes readily available raw materials includes the step of providing a ball point pen of the type having a pen point, a supply of semi-dried ink and a plastic tube containing the semi-dried ink. The plastic tube, point and semi-dried ink are then subjected to a freezing temperature as for example by being placed in the freezing compartment of a home or other refrigerator or freezer for a period of time which is sufficient to solidify the semi-dried ink. The frozen plastic tube is then removed from the freezer and cut into segments preferably of about one centimeter each. The pen point is discarded. Any ink remaining on the edges of the segments is removed as for example with a cotton ball. The method also includes the step of providing at least one and preferably more sheets of absorbent material which are cut into an appropriate size. The absorbent material may comprise several sheets of paper towel. The segment of frozen ink contained in the portion of the plastic tube is then placed on or between the sheets of absorbent material. In a preferred embodiment of the invention, the segment is placed on top of several sheets of paper towel or the like and the tissue is then folded over to encase the segment. A piece of transparent tape which is sized to be slightly larger than the tissue pocket is provided and the tissue placed on an adhesive side of the transparent tape. The transparent tape preferably overlaps the tissue packet and is folded over to form a seal around the sides of the tissue package. The fourth side is sealed by the fold of the tape. A separate piece of transparent tape is then used to attach the indicator to a frozen food container.

DESCRIPTION OF THE DRAWINGS

FIGS. 2–10 illustrate the steps in the method for making a thaw indicator in accordance with the present invention;

DETAILED DESCRIPTION OF THE PREFERRED EMBODIMENTS OF THE INVENTION

Figure 1:
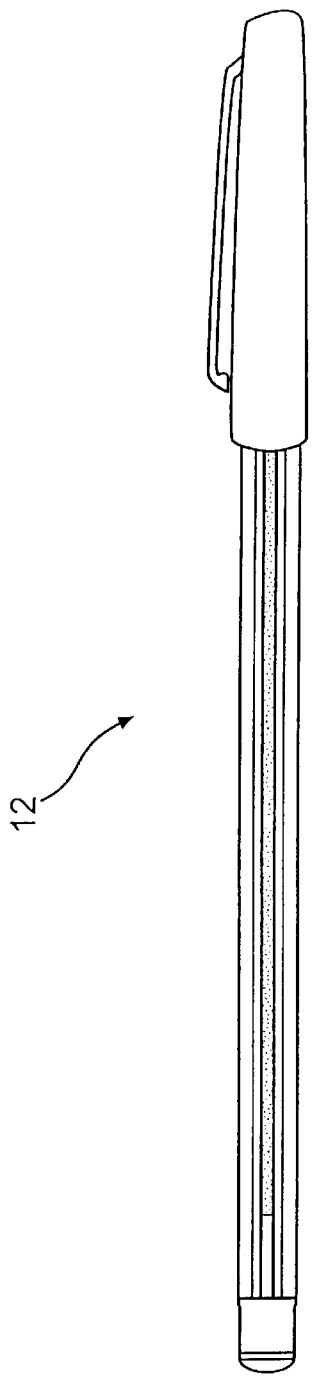
FIG. 1 illustrates a conventional ball point pen of the type used in the practice of the present invention.

The invention will now be described in connection with the accompanying drawings wherein like reference numerals have been used to indicate like parts.

Figure 2:
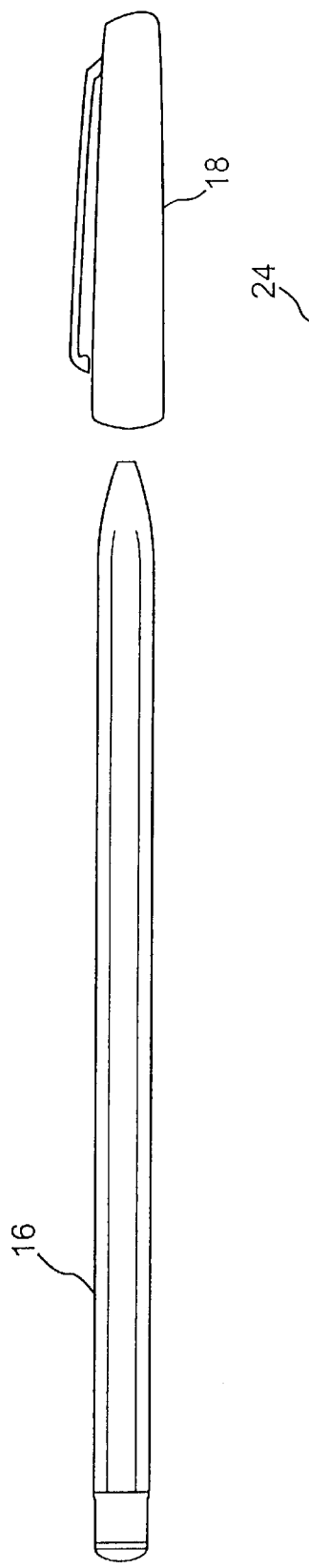
Figure 3:
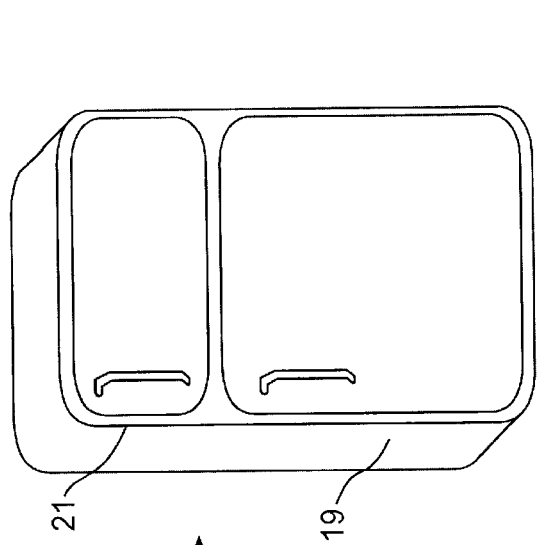

As shown in FIG. 1 a conventional ball point pen 12 is provided and used in making a frozen food thaw indicator in accordance with the present invention. The pen 12 such as a Staedtler brand pen is disassembled into its primary parts as illustrated in FIG. 2. As shown therein, a writing element 14 has been removed from its outer housing 16 after removal of a cap 18.

Figure 4:
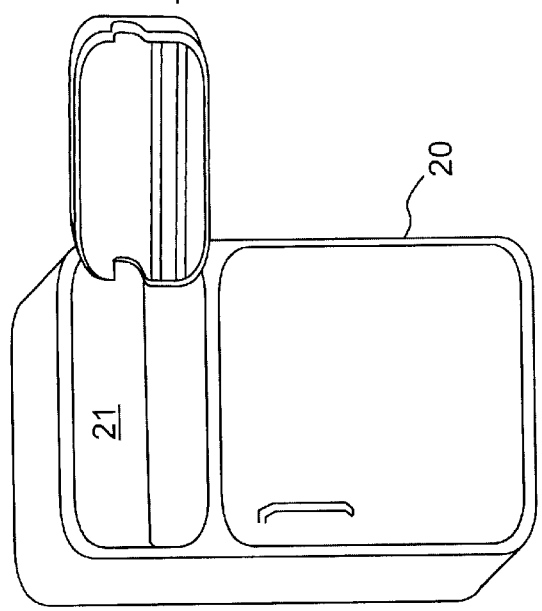

It is important that the pen 12 is of the type that includes a plastic tube 20 and a supply of semi-dried ink 22. While the ink is referred to as semi-dried, it is merely conventional ink of the type used in conventional ball point pens. Such reference may also include certain ink gels. The writing element 14 also includes a conventional ball point 24. In the practice of the present invention, the writing element 14 is placed in the freezer compartment 21 of a conventional refrigerator 19 for a sufficient period of time, about one hour so that the ink is frozen solid. After the semi-dried ink is frozen solid, the writing element 14 is removed from the freezer compartment 21 as illustrated by FIG. 4. Then as illustrated in FIG. 5, the plastic tube 20 containing the frozen semi-dried ink 22 is cut into segments 25. For example the tube 20 can be cut with an ordinary pair of scissors 27. Two pair of scissors 27 are shown to illustrate the cutting process. The two pair of scissors 27 also indicate the approximate size of the segment 25 i.e., about one centimeter. However other cutting implements such as a knife, paper cutter or the like can be used. In a preferred embodiment of this invention the plastic tube 20 is cut into segments 25 having a length of about 1 cm.

Figure 7:
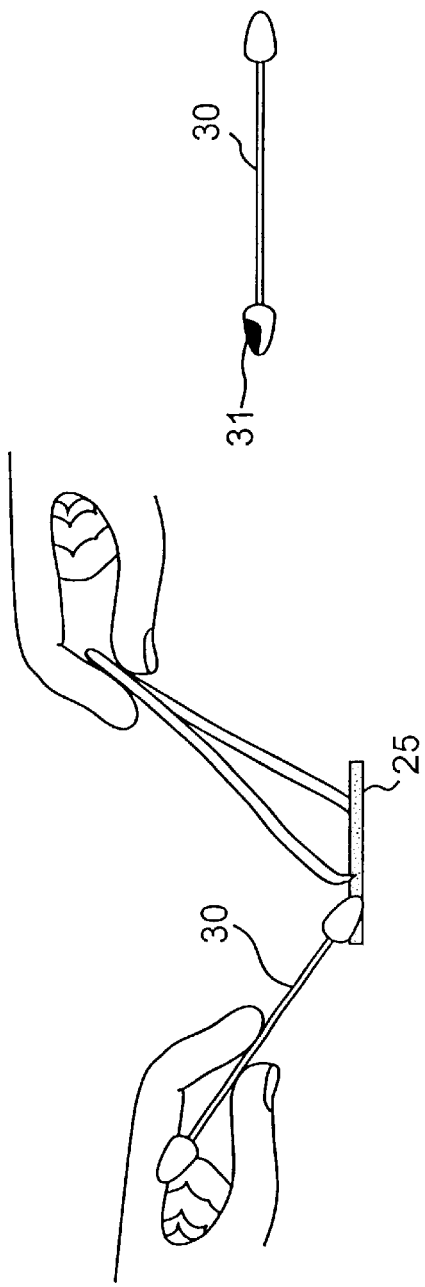

As illustrated in FIGS. 6 and 7, the frozen segments 25 are handled with a pair of tweezers 23 which can also be placed in the freezer compartment 21 with the writing element 14. It is important that the heat of an individuals hands do not thaw the frozen ink. At this stage it is also important to use a cotton swab 30 or other means such as cotton ball or absorbing gauze to remove excess ink from the ends of the segment 25. A cotton swab is preferred since it reduces the risk of staining ones fingers with ink. As illustrated in FIG. 7 one swab 30 is shown with excess ink 31 on one end of the swab 30.

Figure 8:
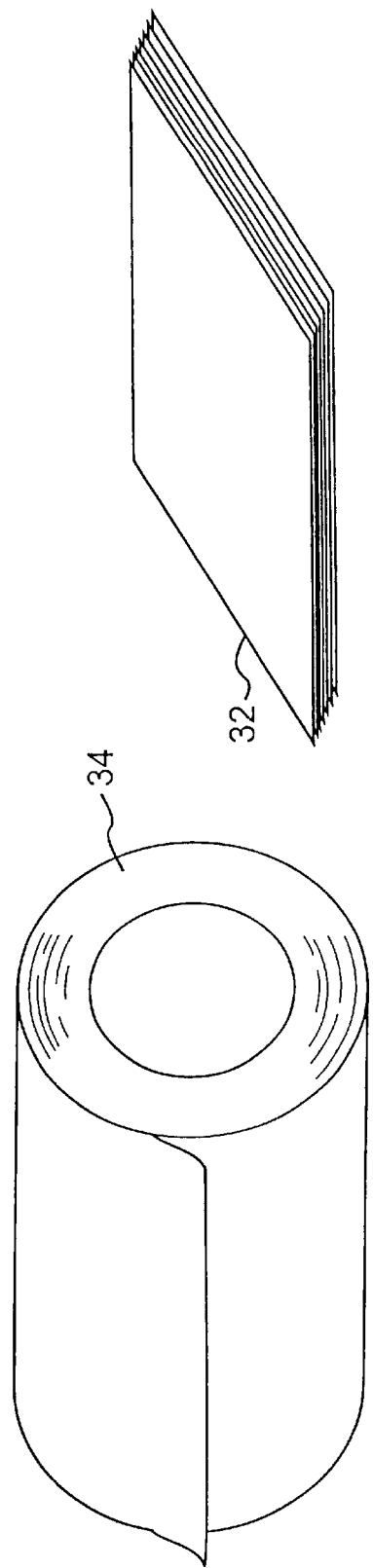

Referring now to FIGS. 8–10, one or more sheets 32 of absorbent media or material are cut into appropriate sizes as for example about 2.8 cm by 2.8 cm by any conventional means. The absorbent media may for example be cut from an ordinary roll 34 of paper towels, tissues or the like. A piece of transparent tape 36 such as Scotch brand cellophane tape is provided and preferably is cut into a square having an edged dimension 37 of about 3.5 centimeters. The transparent tape is laid on a table or the like with the adhesive side up and the sheets 32 placed on top of the tape 36 in a generally centered position. In a preferred embodiment of the invention multiple layers of the sheets 32 are stacked and placed in the center of the piece of tape 36 with the edges 37 of the tape 36 extending outwardly beyond the sheets 32. These steps will typically be taken during the period that the writing element 14 is in the freezing compartment 21 and before removing the element 14 from the freezer compartment 21.

The segment 25 is then placed in a centered portion on one ore more sheets 32 and the sheets 32 and tape 36 are folded over upon themselves to form a closed pouch with the edges sealed together and the frozen segment 25 encased in the stacked sheets 32. When one of the sheets 32 is folded over upon itself it is considered to be two sheets.

Figure 11:
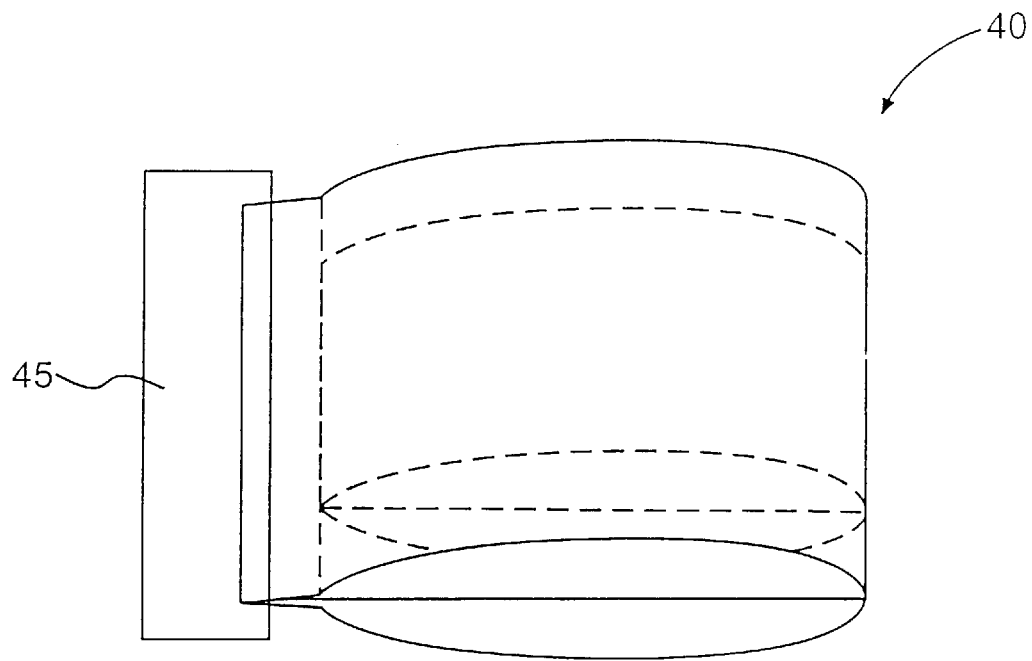
FIG. 11 illustrates a thaw indicator in accordance with the present invention as it appears as long as it is maintained at a freezing temperature.
Figure 12:
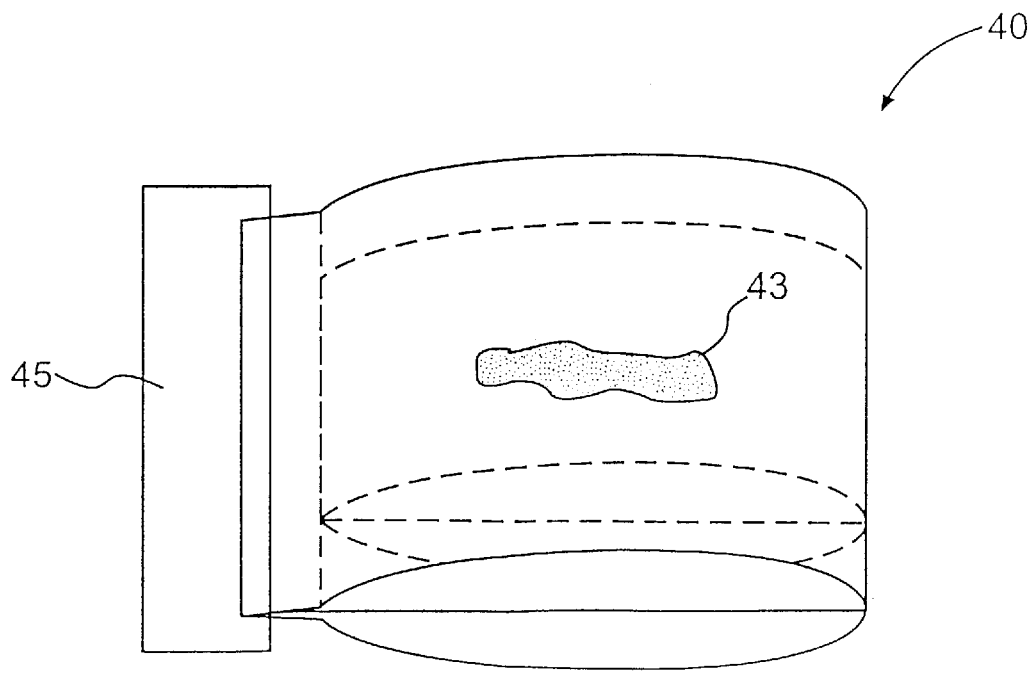
FIG. 12 illustrates a thaw indicator in accordance with the present invention as it appears after being exposed to an above freezing temperature.

FIGS. 11 and 12 show a thaw indicator for frozen foods 40 wherein the thaw indicator 40 has been maintained in a frozen condition in FIG. 11 and allowed to thaw in FIG. 12. As illustrated in FIG. 12, a large ink blot 43 indicates that the indicator and possibly the container to which it is attached have been allowed to thaw. As shown in FIGS. 11 and 12, the indicator 40 may be fastened to a container of frozen foods by a piece of tape 45.

While the invention as been described in connection with its preferred embodiments, it should be recognized that changes and modifications may be made therein without departing from the scope of the appended claims.

What is claimed is:

1. A defrosting indicator for frozen foods comprising a piece of transparent tape, a layer of absorbent material and a frozen segment of an ink cartridge disposed in and surrounded by said absorbent material and said tape, said frozen segment of an ink cartridge including an elongate tubular plastic casing containing semi-dried ink within said casing, and said absorbent material and said frozen segment of an ink cartridge encased in said transparent tape and said indicator adapted to be applied to a container of frozen food whereby if the container is partially thawed, the ink will flow out from open ends of the casing and into the absorbent material to form an ink blot as an indication that the food contained therein may not be fit to eat.

2. A defrosting indicator for frozen foods according to claim 1 in which said ink cartridge comes from a ball point pen and wherein said absorbent media is paper.

3. A method for making a defrosting indicator for frozen foods comprising the steps of:

providing a ball point pen having a pen point, a supply of semi-dried ink and a plastic tube containing the semi-dried ink, subjecting the tube containing the semi-dried ink to a freezing temperature to thereby freeze the semi-dried ink;

cutting the frozen tube into segments which include a portion of the plastic tube and the frozen semi-dried ink therein;

removing any ink from the ends of the segments;

providing two sheets of absorbent material and placing one of the frozen segments between the two sheets; and, providing a piece of transparent tape and encasing the sheets of absorbent material and segment of frozen ink within the tape to provide a defrosting indicator that forms an ink blot in the absorbent media when the ink is defrosted.

4. The method of claim 3 which includes the step of placing the ball point pen in a freezing compartment of a refrigerator for a period of about one hour.

5. The method of claim 4 which includes the step of attaching the indicator to a container of frozen food.

6. The method of claim 5 which includes the steps of removing the semi-dried ink and plastic tube from an outer housing and discarding the pen point after cutting the tube into segments.

7. The method of claim 5 which includes the steps of providing a plurality of layers of absorbent paper as the absorbent material, placing the one frozen segment in a central portion of the absorbent papers and folding the plurality of layers of absorbent papers over the one frozen segment to sandwich the one frozen segment therebetween.

8. The method of claim 7 in which the multiple layers of absorbent paper are placed in a center portion of the piece of transparent tape with the tape extending beyond the absorbent papers on all sides thereof and folding the absorbent papers and tape over the one segment of frozen ink to thereby seal the edges of the tape to encapsulate the frozen ink and absorbent papers within the transparent tape and attaching the encapsulated absorbent papers and frozen ink to the container of frozen food.

\* \* \* \* \*